United States Patent [19]

Otake

[11] Patent Number: 4,897,943
[45] Date of Patent: Feb. 6, 1990

[54] PHOTOGRAPHIC DISPLAY AND APPARATUS FOR MAKING ELEMENTAL PRINTS OF THE SAME

[75] Inventor: Katsumi Otake, Tokyo, Japan

[73] Assignee: Fuji Photo Film Co., Ltd., Kanagawa, Japan

[21] Appl. No.: 169,790

[22] Filed: Mar. 18, 1988

[30] Foreign Application Priority Data

Mar. 18, 1987 [JP] Japan ............................ 62-39569[U]
Mar. 18, 1987 [JP] Japan ................................ 62-63184
Apr. 6, 1987 [JP] Japan ................................ 62-84275

[51] Int. Cl.⁴ ............................................. A47G 1/06
[52] U.S. Cl. ..................................... 40/158.1; 40/159
[58] Field of Search ................... 40/158.1, 159.1, 624, 40/159; 156/63; 428/39, 33, 46; 355/54, 40, 74, 77

[56] References Cited

U.S. PATENT DOCUMENTS 4,244,769  1/1981  Tracy .................................... 428/46

Primary Examiner—Robert P. Swiatek
Assistant Examiner—Cary E. Stone
Attorney, Agent, or Firm—Sughrue, Mion, Zinn, Macpeak & Seas

[57] ABSTRACT

A picture display representing an enlarged image is divided into print portions arranged in predetermined fashion on a display panel to display a complete enlarged picture. A printing apparatus for making the print portions from a single frame of an original film has a printing stage movable in two mutually perpendicular directions sequentially place in printing position each of a plurality of divisions into which the single image of the original film is nominally divided, in order to make enlarged print portions.

18 Claims, 10 Drawing Sheets

PHOTOGRAPHIC DISPLAY AND APPARATUS FOR MAKING ELEMENTAL PRINTS OF THE SAME

BACKGROUND OF THE INVENTION

The present invention relates to a photographic picture display and to an apparatus for making elemental prints of the photographic picture display.

For displaying large photographic pictures on, for example, a wall, an enlarged print may be mounted on a frame or attached to a display panel. Large photographic paper has been used to make large prints.

Printing costs for such large pictures made on large size photographic paper from a standard format of original film such as negative films, positive films or the like, increase with printing size or magnification ratio. Another problem is the magnification range of such large prints, which depends on the sizes of photographic papers now commercially available.

Meanwhile, to make large prints, expensive large format enlargers or printers are needed. Printing costs for large prints made by such large format enlargers or printers also increase with printing size or magnification ratio.

SUMMARY OF THE INVENTION

In view of the foregoing, it is an object of the present invention to provide low cost large picture displays.

It is another object of the present invention to provide a photographic apparatus which can make low cost large picture displays.

The above and other objects are accomplished by providing a large picture display which comprises a display panel and a number of partial prints arranged together so as to constitute a single picture on the display panel. Such partial prints are enlarged and printed by an enlarger or printer on regular size photographic paper from an image frame of an original film which is nominally divided into a number of parts. These partial prints are mutually separated and arranged on the display panel. Such an arrangement according to the present invention enables the showing of unconventional interests to viewers.

For making partial prints, the printer according to the present invention is provided with a printing stage which is movable in two directions perpendicular to each other so as to place into printing position smaller portions of an original film into which the image frame of the original film is nominally divided. The printing stage comprises a table movable in one direction and a film holder holding the original film and supported on the stage for movement in another, perpendicular direction. By moving the film holder and the stage perpendicularly to each other, the original may be moved so as to place any portion of an image frame of the original in the printing position. The printing stage may be either automatically sequentially controlled to move by a controller or manually moved according to patterns of the portions.

According to a feature of a preferred embodiment of the present invention, the enlarged print portions include overlapped marginal image areas in common with respective adjacent partial prints. Because of the overlapped marginal image area, the partial prints arranged with separation as a single picture can be viewed without the feeling of visual disorder.

BRIEF DESCRIPTION OF THE DRAWINGS

The foregoing and other objects and features of the present invention will be apparent from the following description of preferred embodiments with reference to the accompanying drawings, in which.

DESCRIPTION OF THE PREFERRED EMBODIMENTS

Figure 1A:
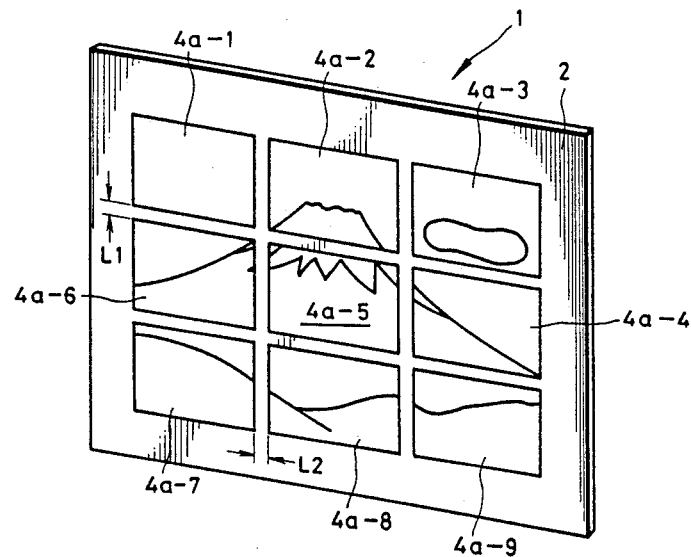
FIG. 1A is a perspective view of the picture display of an embodiment according to the present invention.
Figure 1B:
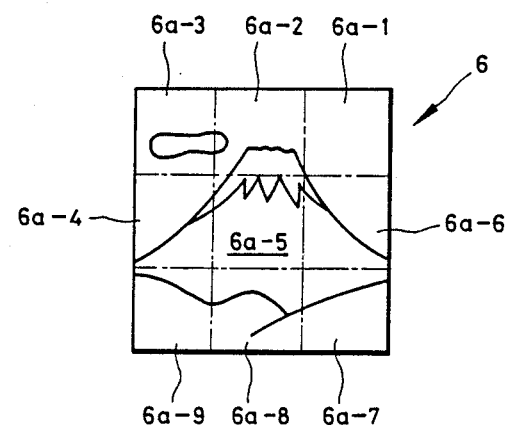
FIG. 1B is a plan view of an image frame of an original film which is nominally divided into a number of smaller portions.

Referring now to FIGS. 1A and 1B showing a photographic picture display 1 according to the present invention, a plurality (nine, in this embodiment) of smaller picture print portions 4a-1 to 4a-9 are arranged in a matrix on a display panel 2 so as to form a single complete picture. These smaller prints 4a-1 to 4a-9 are separated by a distance L1 in columns and by a distance L2 in rows, so as to display a single complete picture without a feeling of visual disorder.

The display panel 2 may be made of various materials such as plastic plate, aluminum plate, cardboard, or the like. For a clear display, the display panel 2 may be either white or suitably colored when the print portions 4a-1 to 4a-9 are made by using photographic paper. Alternatively, when making the print portions 4a-1 to 4a-9 by using a transparent material coated with an emulsion layer, the display panel 2 may be made suitably of a transparent plate. In this case, the picture display 1 maybe illuminated from the back by the use of a lamp.

Each print portion 4a-1 to 4a-9 is provided by making a regular size, namely E-size (82×114 mm) enlarged print from each of a corresponding plurality of small portions 6a-1 to 6a-9 into which an image frame 6 of a negative film (shown in FIG. 1B) is nominally divided.

Figure 2:
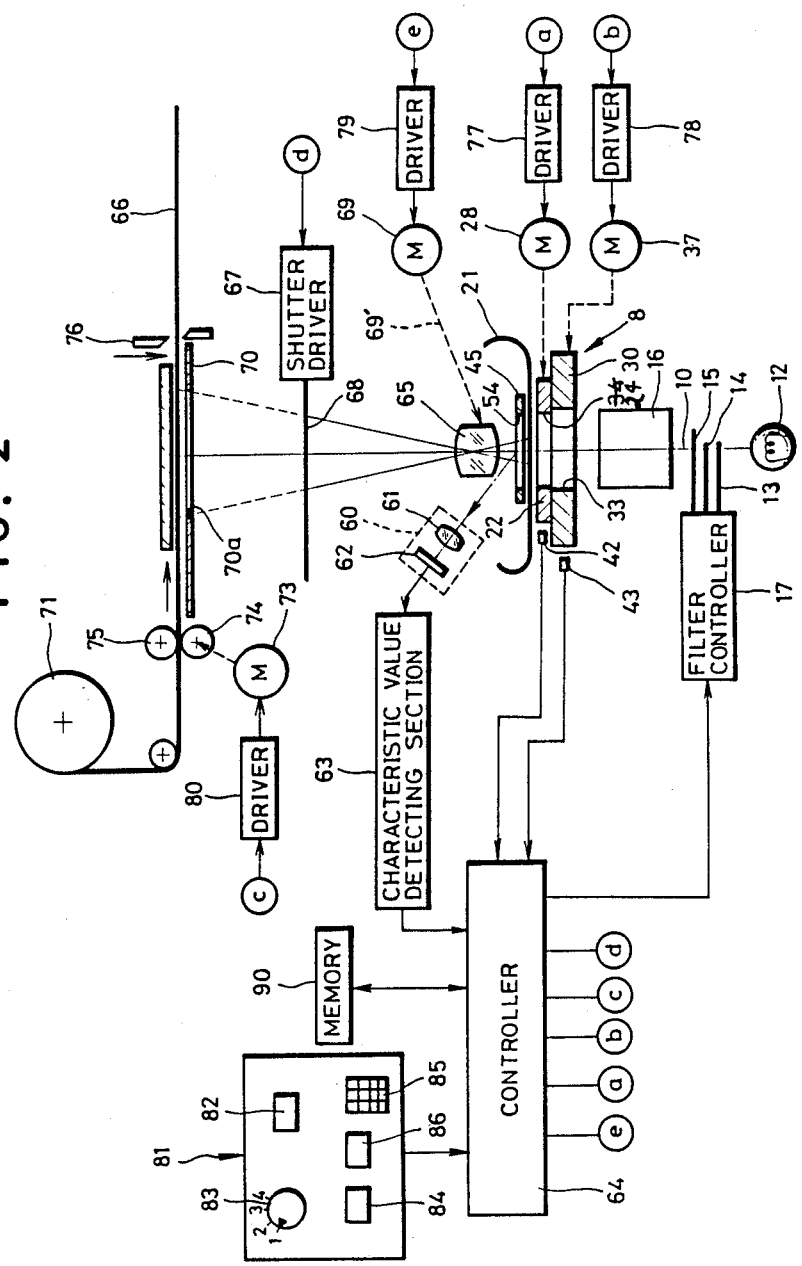
FIG. 2 is a schematic diagram of a printer according to the present invention.

FIG. 2 shows a printer according to the present invention, by which the enlarged print portion 4a-1 to 4a-9 are made. As shown, there are three complementary color filters 13, 14 and 15, namely cyan, magenta and yellow, controlled by a filter controller 17. Each color filter 13, 14, 15 may be inserted independently of the other two between an illumination lamp 12 for emitting white printing light and a mirror box 16 which comprises a square hollow tube having inner mirrored walls and top and bottom diffusion plates. The white light from the lamp 12 passes through appropriate ones of the color filter, 13, 14, and 15 into the mirror box 16 and is sufficiently diffused thereby.

After passing through a color negative film 21 (including the image frame 6 shown in FIG. 1B) which is placed on a printing stage 8 disposed on a printing optical axis 10, the diffused light is focused on a photographic paper 66. The printing stage 8 comprises a film holder 22 having an exposure opening 24 and a slidable table 30 having an exposure opening 33. As will be described in detail later, the table 30 is movably supported by a fixed frame 38 (see FIG. 4) of the printer. The film holder 22 and slidable table 30 are moved in directions perpendicular to each other by pulse motors 28 and 37 controllably driven by respective drivers 77 and 78. When positioned at their initial positions, namely one extremity of their movable range, positions of the holder 22 and table 30 can be detected by photosensors 42 and 43, respectively.

Off the upper left of a masking frame 45 (as viewed in FIG. 2) there is a scanner 60 comprising a lens 61 and an image area sensor 62 to measure the entire area of an image frame of the negative film 21 to detect light intensities of a large number of picture elements into which the image frame is nominally divided. The light intensity for each picture element is transmitted to an image characteristic value detecting section 63 to provide an image characteristic value such as a large area transmittance density (LATD), a maximum density, a minimum density, a mean density for specified picture elements, or the like, for each color. The characteristic value in turn is sent to a controller 64 mainly comprising a micro-computer as is well known in the art.

An enlarging lens, preferably a zoom lens 65, is disposed above the printing stage 8 and is disposed in the optical path 10 of the illumination light. The lens 65 is moved by a motor 69 through a gear train 69 to change its focal length. Between the zoom lens 65 and a photographic paper 66 there is a shutter 60 controlled by a shutter driver 67 which opens the shutter for a certain time to create a latent image of the image frame of the negative film 21 on the photographic paper 66.

The photographic paper 66, in the form of a roll 71, is withdrawn by means of a pair of feeding rollers 74 and 75 driven by a pulse motor 73, and is placed in an exposure station formed by an exposure masking frame 70 defining an exposure aperture 70a for an E size print therein. Adjacent to the exposure masking frame 70, there is a cutter 76 for cutting off an exposed part of the photographic paper 66 after a predetermined number of exposures. The cut exposed part of photographic paper then is transported into a well known processor (not shown) and subjected to developing, bleaching-fixing and rinsing.

The pulse motors 28, 37, 69 and 73 are controlled in direction and amount of rotation by the controller 64 through the respective drivers 77 to 80. The filter controller 17 and the shutter driver 67 also are controlled by the controller 64.

An instruction entering device 81 is connected to the controller 64, and includes an operating mode selection key 82 for selecting an automatic printing operation or a manual printing operation, a division pattern selection key 83 for selecting one of various division patterns which have been previously prepared, a printing key 84, overlapping ratio setting keys 85, and a power switch 86. There are ten overlapping ratio setting keys 85 for entering a desired percentage overlapping ratio. Connected to the controller 64 is a memory 90 which stores data on sequential control programs of operation for the printing stage, an automatic printing operation, division patterns and others.

FIGS. 3 through 6 show in detail the printing stage 8. The film holder 22 is formed with a wide groove 23 into which the negative film 21 fits and a rectangular or square opening 24 at the middle of the wide groove 23. On one side of the film holder 22 there are brackets 22a and 22b which support a pivot shaft 29 swingably mounting the masking frame 45 through brackets 46a and 46b. A glass plate 52 is attached to the back of the masking frame 45 to keep the negative film 21 flat in the groove 23 of the film holder 22.

Mounting members 26 and 27 are fixed to the back of the film holder for slidably mounting the film holder 22 on the slidable table 30 by means of guide rails 31 and 32 fixed to and extending over the slidable stage 30. The guide rails 31 and 32 enable the film holder 22 to move back and forth in one direction (which hereinafter will be eeferred to as the Y direction). A feed screw 25 is provided between the film holder 22 and the pulse motor 28 and is mounted on the slidable table 30 to enable the film holder 22 to move back and forth in the Y direction. Specifically, the feed screw 25 is threadedly engaged at one end by the mounting member 27 and has at its opposite end a pulley 28c. Between the pulley 28c and a pulley 28a attached to an output shaft of the pulse motor 28 a driving belt 28b is stretched to operably couple the pulse motor 28 to the feed screw 25, so that the film holder 22 is moved in the Y direction through rotation of the pulse motor 28.

Figure 3:
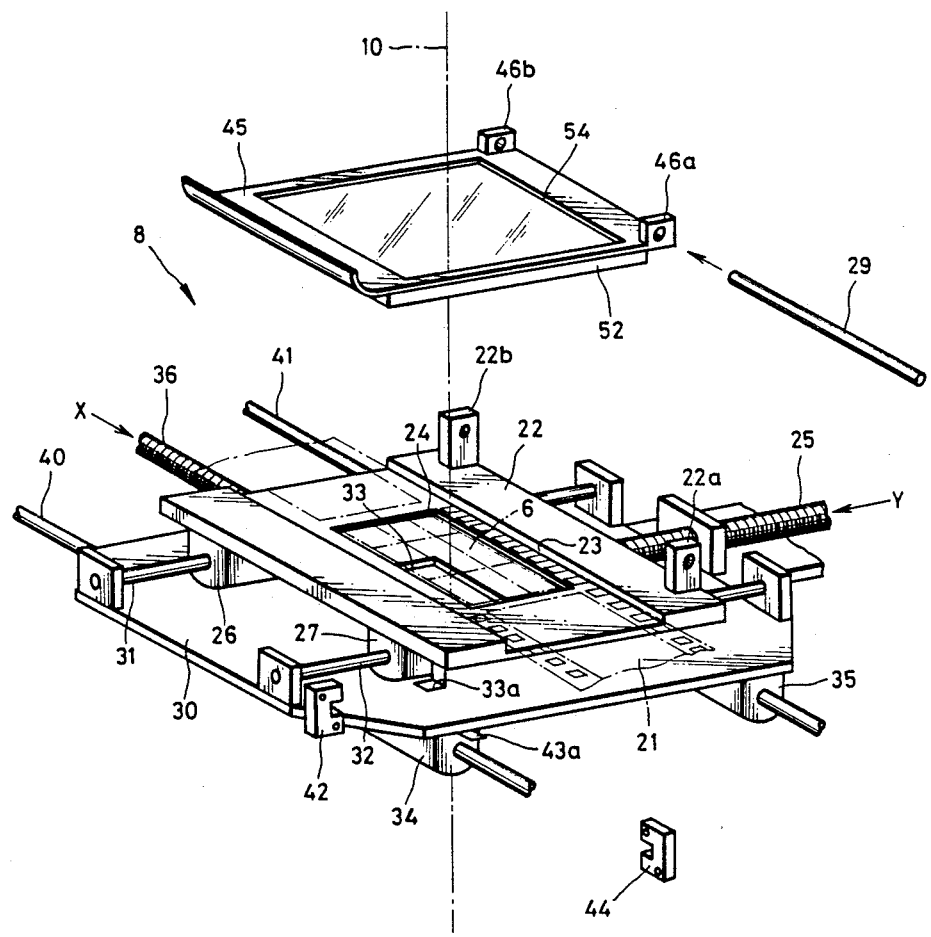
FIG. 3 is a exploded perspective view of a printing stage of the printer of FIG. 2.
Figure 4:
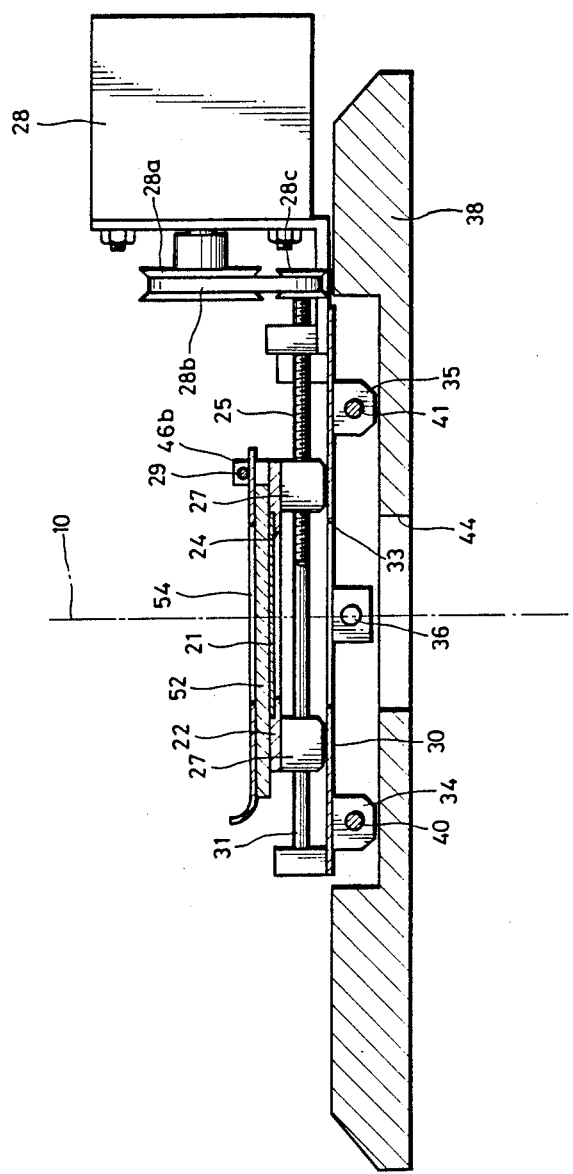
FIG. 4 is a cross sectional view of the printing stage of FIG. 3.
Figure 5:
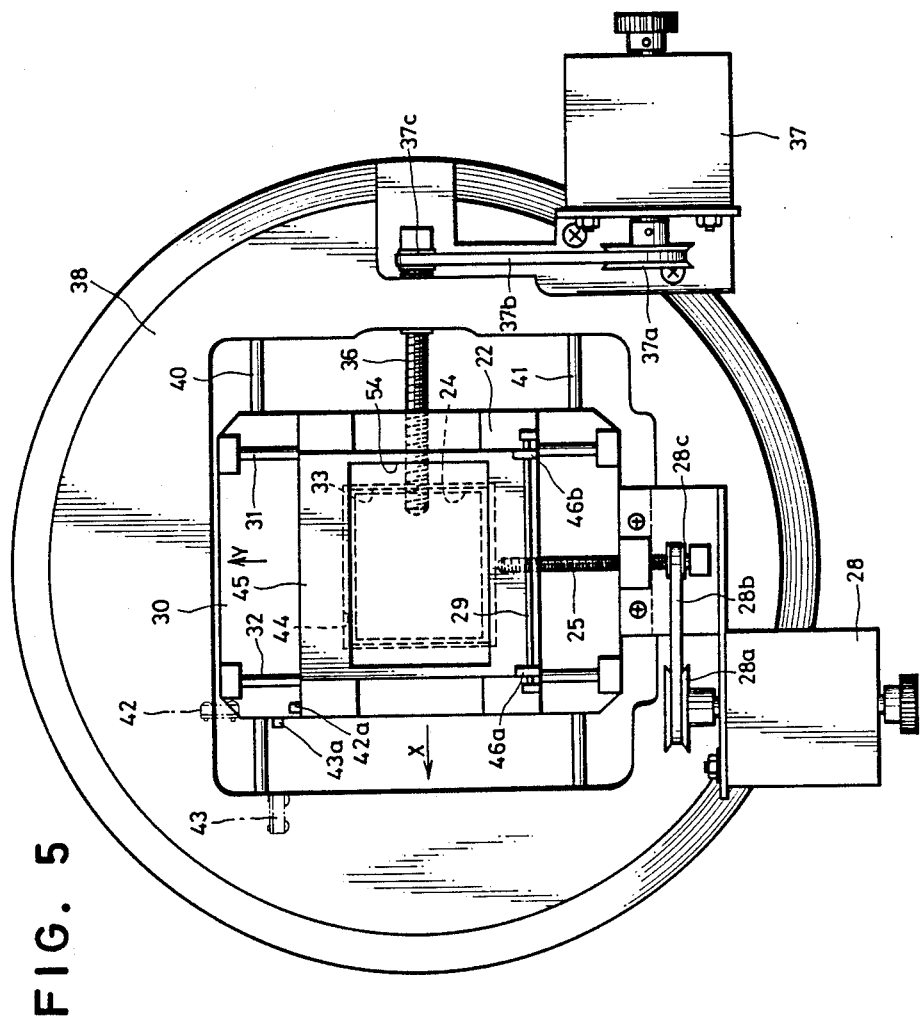
FIG. 5 is a plan view of the printing stage of FIG. 3.
Figure 6:
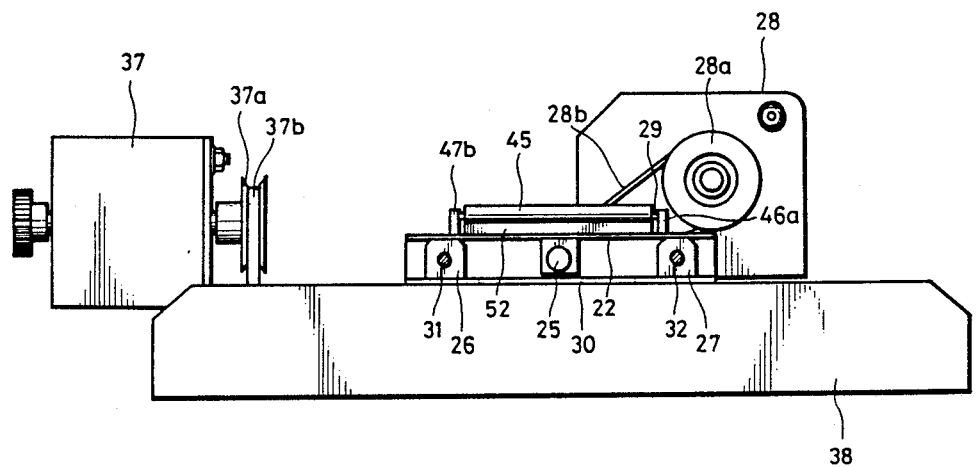
FIG. 6 is a side view of the printing stage of FIG. 3.

As is clearly seen in FIGS. 3 and 4, on the back of the slidable table 30 there are provided mounting members 34 and 35 slidably mounted on guide rails 40 and 41 extending in the direction perpendicular to the Y direction (which hereinafter will be referred to as the X direction). As shown in FIGS. 5 and 6, these guide rails 40 and 41 are supported on a base plate 38 of the printer on which the pulse motor 37 is mounted. The pulse motor 37 has a pulley 37a fixed to an output shaft thereof. A driving belt 37b is stretched between the pulley 37a of the motor 37 and a pulley 37c at the end of a feed screw 36 threadedly engaged with the slidable table 30, so that the slidable table 30 is operably coupled to the motor 37 for back and forth movement along the X direction.

At one end of guide rails 32 and 40 there are respective photosensors 42 and 43 which detect light opaque members 42a and 43a attached to the top ends of the film holder 22 and the slidable table 30, respectively. Because of the mobility of the printing stage 8 the perpendicular X and Y directions, any division 6a-1 to 6a-9 of the image frame 6 of the negative film 21 can be placed in the optical path of 10.

Figure 7:
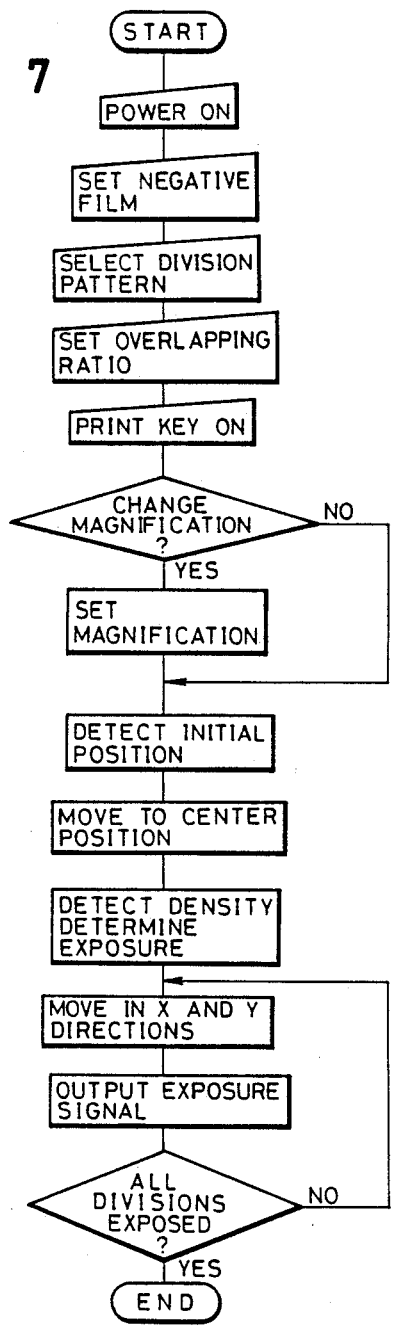
FIG. 7 is a flow chart showing a sequence of operation for making a partial print.
Figure 8:
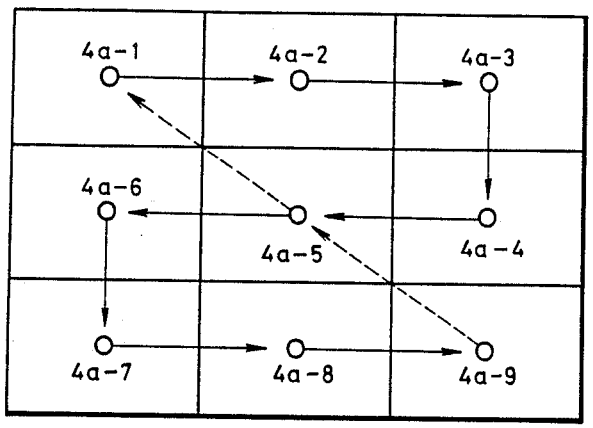
FIG. 8 is an illustration of a sequence for making nine partial prints.

FIGS. 7 and 8 show an operation of the printer of the present invention when making nine (9) print portions 4a-1 to 4a-9 without overlapped marginal area, the print portions being arranged in a 3×3 matrix on the display panel 2 to display an enlarged single picture. First, the power switch 86 is turned on and the image frame 6 of the negative film 21 is placed in the wide groove 23 of the film holder 22 over the opening 24. Then the negative film 21 is held down by the masking frame 45 so as to be kept flat in the wide groove 23 of the film holder 22. The operation mode selection key 82 is operated to select an automatic operation mode. The division pattern selection key 83 then is operated to select a 3×3 matrix pattern and the overlapping ratio setting key 85 is operated to set the overlapping ratio to zero in percent. As a result, according to the entered division pattern and overlapping ratio instructions, the controller 64 selectively retrieves from the memory 90 a sequential control program by which the printing stage is sequentially moved.

When operating the printing key 84, as the first sequential operation, the controller 64 controls the driver 79 to cause the pulse motor 69 to rotate to vary the focal length of the zoom lens 65 in order to fix a desired magnification to make E size prints.

The controller 64 then instruct the drivers 77 and 78 to rotate the pulse motors 28 and 37, moving the film holder 22 in the X direction to its left extremity as viewed in FIG. 5 and the slidable table 30 in the Y direction to its upper side extremity as viewed in FIG. 5. As a result, the photosensors 42 and 43 are interrupted by the light opaque members 42a and 43a, respectively, and provide stop signals which in turn are sent to the controller 64. Consequently, the controller 64 stops the pulse motors 28 and 37 and thus locates the film holder 22 and the slidable table 30 at their respective extreme (initial) positions.

Next, the controller 64 reverses the pulse motors 28 and 37 to move back to film holder 22 and the slidable table 30 and align the centers of the openings 24 and 33 of the film holder 22 and the slidable table 30, particularly the center of the image frame 6 of the negative film 21, with the optical axis 10. The position where the film holder 22 and the slidable table 30 place the center of an image frame 6 of the negative film 21 in the optical axis 10 is referred to as a center position. To move the film holder 22 and the slidable table 30 to their center positions from their initial positions, the film holder 22 is moved by one third of the length of the image frame 6 of the negative film 21; the slidable table 30 is moved by one third of the width of the image frame of the negative film 21.

After the negative film 21 is in the center position, the negative film 21 is measured by a scanner 60 to detect red, green, and blue transmittance densities. Based on the detected transmittance densities, the image characteristic value detecting section 63 detects characteristic values for the three colors, which in turn are sent to the controller 64 in order to determine positions of the color filters 13 to 15 in the optical path 10 and shutter speed of the shutter 68 for proper exposure.

Following the determination of exposures, the controller 64 sequentially controls the pulse motors 28 and 37 to move the film holder 22 and the slidable table 30, respectively, to align the center of the first portion 6a-1 of the image frame 6 of the negative frame 21 with the optical axis 10. Specifically, the film holder 22 is moved in the Y direction by one third of the width of the image frame 6 of the negative frame 21 and the slidable table 30 is moved in the X direction by one third of the length of the image frame 6 of the negative frame 21. Then, the controller 64 actuates the filter controller 17 to place the color filters at their proper positions while the shutter 68 is operated at the determined shutter speed by the shutter driver 67, thereby forming an enlarged latent image 4a-1 of the first portion 6a-1 of the image frame 6 of the negative frame 21 on the photographic paper 66 in three color sequential exposure, as is well known in the art.

After the exposure of the first portion 6a-1, the controller 64 controls the driver 80 to rotate the pulse motor 73 in order to withdraw the photographic paper 66, placing an unexposed part of the photographic paper 66 in the exposure station defined by the exposure masking frame 70. Thereafter, the controller 64 controls the driver 78 to rotate the pulse motor 37 and move back the slidable table 30 in the X direction by one third of the length of the image frame 6 of the negative film 21. As a result, the center of the second portion 6a-2 of the image frame 6 of the negative film 21 is aligned with the optical axis 10. The exposure for the second portion 6a-2 of the image frame 6 is effected in the same manner as for the first portion 6a-1.

For the exposure of the third portion 6a-3 of the image frame 6, the photographic paper 66 again is unwound from the roll 71 and the slidable table 30 is moved back again by the same distance. After the exposure of the third portion 6a-3 of the image frame 6, the controller 64 unwinds the paper and controls the driver 77 to rotate the pulse motor 28 so as to move back the film holder 22 in the Y direction by one third of the width of the image frame 6 of the negative frame 21 so as to bring the center of the fourth division 6a-4 in alignment with the optical axis 10. For the fifth and sixth divisions, the slidable table 30 is moved in the X direction by the same distance after the exposure of the previous division 6a-3 of the image frame 6. Thus, each division 6a is placed in the exposure position and then exposed under the same exposure conditions.

After exposure of all the portions 6a-1 to 6a-9 of the image frame 6 of the negative film 21, the controller 64 controls the driver 77 and 78 to rotate the pulse motor and return the film holder 22 and the slidable table 30 to their center positions. Thereafter, the exposed part of the photographic paper 66 on which the enlarged latent images 4a-1 to 4a-9 of the nine portions 6a-1 to 6a-9 of the image frame 6 of the negative film 21 have been formed is cut off by the cutter 76 and transported into a paper processor well known in the art to provide respective finished enlarged partial prints.

Figure 9C:
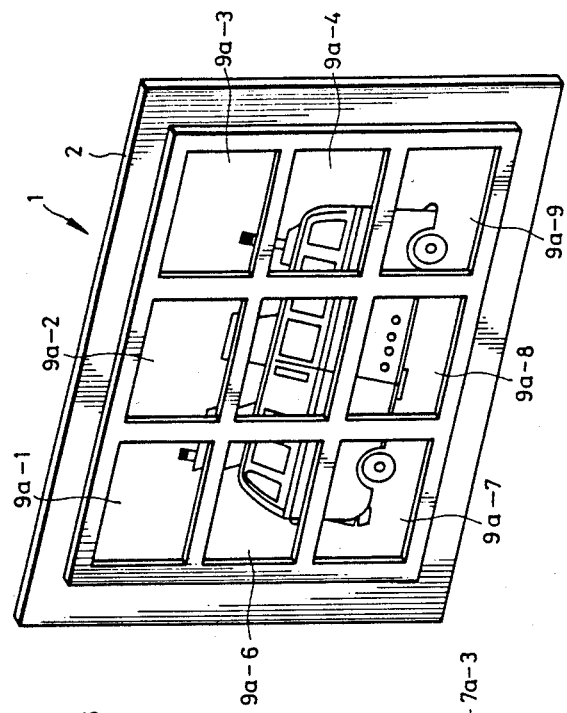
FIG. 9C shows a picture display according to another embodiment of the present invention.
Figure 9A:
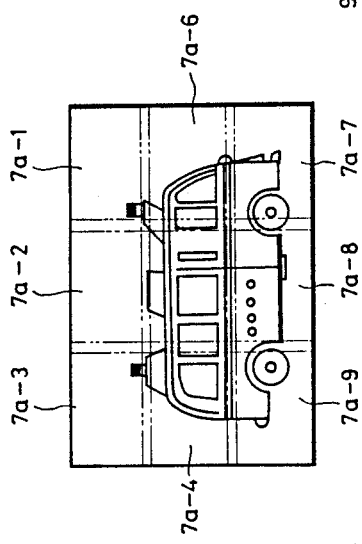
FIG. 9A is a plan view, similar to FIG. 1B, of an image frame of an original film which is nominally divided into a number of smaller portions.
Figure 9B:
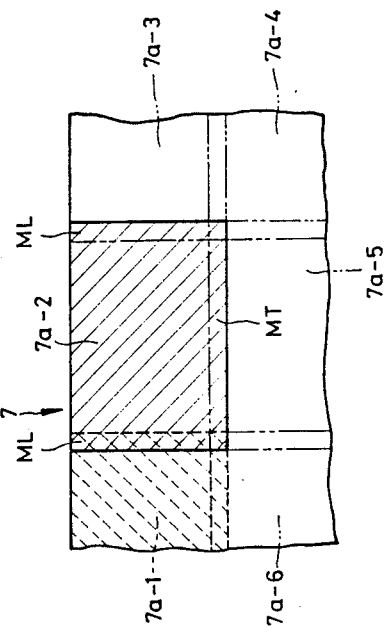
FIG. 9B is a more detailed illustration of some of the smaller portion of the original film of FIG. 9A.

FIGS. 9A to 9C show a picture display in which print portions with overlapped marginal areas are used. In this case, an image frame 7 of the negative film 21 is nominally divided into expanded portions 7a-1 to 7a-9, each pair of adjacent expanded divisions having common lengthwise and transverse marginal areas ML and MT. For example, the expanded division 7a-2 has three overlapped marginal areas, namely lengthwise marginal areas ML on opposite sides thereof which are also included in laterally adjacent expanded divisions 7a-1 and 7a-3, and a transverse marginal area MT which is also included in an expanded division 7a-5 thereof. Also, the expanded division 7a-5 has lengthwise marginal areas ML on opposite sides thereof and top and bottom transverse marginal areas MT.

Prints of these expanded divisions 7a-1 to 7a-9 of the image frame 7 of the negative film 21 are made in the same manner as for the prints of divisions 6a-1 to 6a-9. The overlapping ratio setting key 85 is operated to set overlapping ratios (the widths of margins ML and MT)

as percentages as well as the division pattern selection key 83. Usually, the overlapping ratio of marginal areas desirably is less than about ten (10) percent of the width or length of an image frame, to avoid the feeling of visual disorder.

In accordance with the operation of the overlapping ratio setting key 85 and the division pattern selection key 83, the controller 64 reads out from the memory 90 another sequential control program, in which the film holder 22 and the slidable table 30 are moved stepwise by a distance shortened by the width ML or MT of the margins to be overlapped, and the zoom lens 65 is readjusted to select a focal length suitable for making the same E size of enlarged partial prints 9a-1 to 9a-9 from the expanded divisions 7a-1 to 7a-9, respectively. Following such preparatory operations, the printing key 84 is operated to perform a program controlled operation in the same manner as for the prints with no overlapping marginal area.

Figure 10:
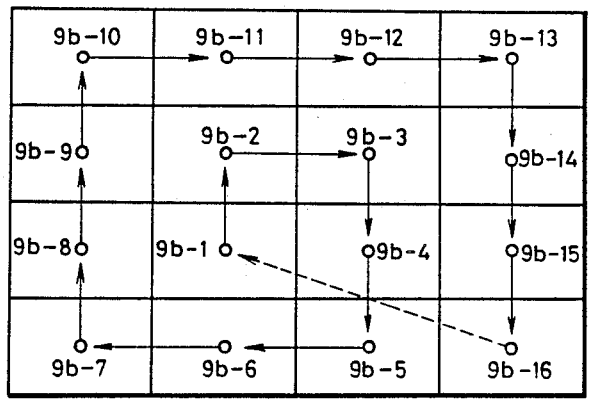
FIG. 10 is an illustration, similar to FIG. 8, of a sequence for making 16 partial prints.

When it is desired to print 16 partial prints from an image frame 9 of the negative film 21, the image frame of the negative film 21 is nominally divided into 16 smaller portions 9b-1 to 9b-16. The printing stage is moved in the numbered order indicated in FIG. 10 to divide the image frame 9 appropriately. Actually, when the division pattern selection key 83 is operated to select a 4×4 division pattern, the controller 64 selects a sequential control program in which the printing stage is moved stepwise so as to place the portions 9b-1 to 9b-16 in the optical axis 10 in the sequence indicated by the 30 numbered arrows. In this case, exposure control and printing operation are effected in the same manner as described above. It should be noted that this sequence, as well as the sequence shown in FIG. 8, may be changed as desired by altering the program.

Also, it is to be noted that the printing stage 8 may be manually operated, if desired. In that case, the operation mode selection key 82 would be operated to select the manual operation mode. As a result of the selection of the manual operation mode, a printing stage shift key (not shown) is made operative to move the printing stage stepwise or linearly so as to place any part of the image frame 6 of the negative film 21 in the optical axis 10.

Figure 11:
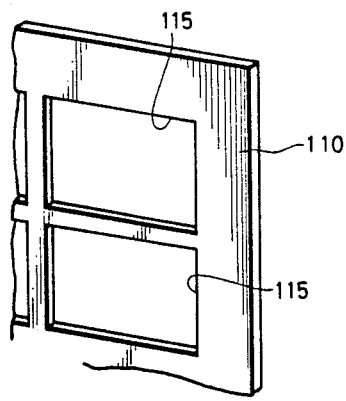
FIG. 11 is a perspective view partly showing an example of display panel.
Figure 12:
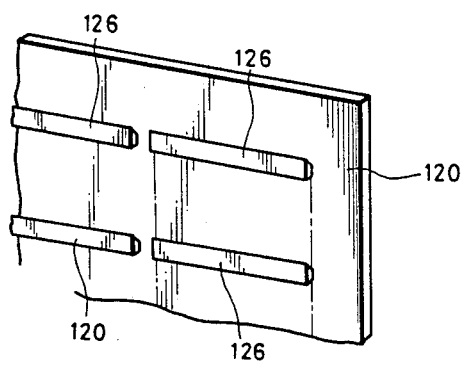
FIG. 12 is a perspective view showing part of another example of a display panel.
Figure 13:
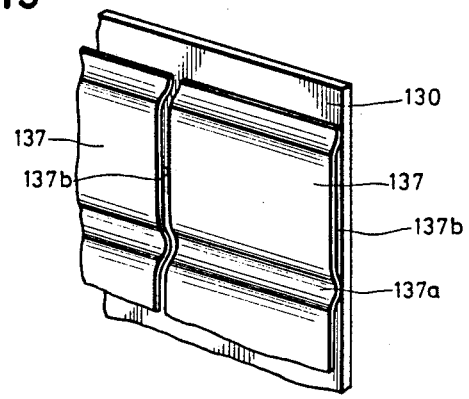
FIG. 13 is a perspective view partly showing still another example of a display panel.

The partial prints 4a-1 to 4a-9 or 9a-1 to 9a-9 made in the manner as described above are attached to the display panel 2 as shown in FIG. 1A and 9C. respectively. Alternatively, the display panel, which may or may not be transparent, can take various forms, as shown in FIGS. 11 to 13 by way of example. In FIG. 11, a display panel 110 is formed with a plurality of mounting recesses 115 with separations between adjacent recesses in which the print portions 4a-1 to 4a-9 or 9a-1 to 9a-9 are fitted. To prevent each print portion from falling off, it is convenient to mount the print portions by using tapes or other suitable adhesives.

FIG. 12 shows another form of a display panel 120 on which a plurality of rails 126 having a trapezoidal cross section are arranged transversely at regular intervals. Between each pair of rails 126 a picture portion is inserted. Because side surfaces of each rail are at acute angles relative to the surface of the display panel 120, each print portion can be held between the rails 126 without falling off. Also, instead of arranging the rails transversely, it may be permissible to arrange them lengthwise on the display panel.

FIG. 13 shows still another form of a display panel 130 to which a plurality of web-like transparent sheets 137 are attached by welding the transparent sheets 137 to the display panel 130 along several lines 137a spaced apart by a distance equal to the width of a print portion so as to form a plurality of open ended envelopes 137b. Each picture print portion then may be inserted into the envelope 137b through the end opening.

Although various embodiments of the present invention have been described in detail, different modifications within the scope and spirit of the invention will be apparent to those skilled in the art. Therefore, the invention should be considered to be limited only by the scope of the appended claims, which follow immediately.

What is claimed is:

1. A picture display for displaying a large photographic picture, said large photographic picture representing an enlargement of an image recorded on an image frame of a film original, said display comprising:
    a display panel; and
    a roll of photographic paper containing a plurality of print portions which comprise enlarged images of a plurality of divisions into which said image frame is nominally divided, said print portions being formed consecutively on said roll of said photographic paper, said roll of photographic paper being cut into said print portions after processing;
    wherein said plurality of print portions are arranged in a predetermined fashion on said display panel so as to present substantially the same photographic picture as said large photographic picture.

2. A picture display as defined in claim 1, wherein each of said plurality of print portions have overlapped marginal areas which are common to adjacent ones of said print portions.

3. A picture display as defined in claim 1, wherein said display panel includes a plurality of separated mounting recesses in which said plurality of print portions are mounted.

4. A picture display as defined in claim 1, wherein said display panel includes a plurality of print holding members for holding said plurality of print portions.

5. A picture display as defined in claim 4, wherein each of said plurality of print holding members comprises a pair of rails having a trapezoidal cross section between which one of said plurality of print portions is held.

6. A picture display as defined in claim 4, wherein each of said plurality of print holding members comprises a transparent cover sheet attached to said display panel, said print portion being held between said transparent cover sheet and display panel.

7. A picture display for displaying a large photographic picture, said large photographic picture representing an enlargement of an image recorded on an image frame of a film original, said display comprising:
    a display panel; and
    a transparent web-like sheet with a photosensitive emulsion coated thereon, said transparent web-like sheet containing a plurality of print portions which comprise enlarged images of a plurality divisions into which said image frame is nominally divided, said print portions being formed on said transparent web-like sheet, said transparent web-like sheet being cut into said print portions after processing;
    wherein said plurality of print portions are arranged in a predetermined fashion on said display panel so as to present substantially the same photographic picture as said large photographic picture, and wherein said display panel is transparent.

8. A picture display as defined in claim 7, wherein each of said plurality of print portions have overlapped marginal areas which are common to adjacent ones of said print portions.

9. A picture display as defined in claim 7, wherein said display panel includes a plurality of separated mounting recesses in which said plurality of print portions are mounted.

10. A picture display as defined in claim 7, wherein said display panel includes a plurality of print holding members for holding said plurality of print portions.

11. A picture display as defined in claim 10, wherein each of said plurality of print holding members comprises a pair of rails having a trapezoidal cross section between which one of said plurality of print portions is held.

12. A picture display as defined in claim 10, wherein each of said plurality of print holding members comprises a transparent cover sheet attached to said display panel, said print portions being held between said transparent cover sheet and said display panel.

13. A picture display for displaying a large photographic picture, said large photographic picture representing an enlargement of an image recorded on an image frame of a film original, said display comprising:
a display panel; and
a web-like transparent sheet containing a plurality of print portions which comprise enlarged images of a plurality divisions into which said image frame is nominally divided, said print portions being formed consecutively on said transparent web-like sheet, said transparent web-like sheet being cut into said print portions after processing, wherein said plurality of print portions are arranged in a predetermined fashion on said display panel so as to present substantially the same photographic picture as said large photographic picture.

14. A picture display as defined in claim 13, wherein each of said plurality of print portions have overlapped marginal areas which are common to adjacent ones of said print portions.

15. A picture display as defined in claim 13, wherein said display panel includes a plurality of separated mounting recesses in which said plurality of print portions are mounted.

16. A picture display as defined in claim 13, wherein said display panel includes a plurality of print holding members for holding said plurality of print portions.

17. A picture display as defined in claim 16, wherein each of said plurality of print holding members comprises a pair of rails having a trapezoidal cross section between which one of said plurality of print portions is held.

18. A picture display as defined in claim 16, wherein each of said plurality of print holding members comprises a transparent cover sheet attached to said display panel, said print portion being held between said transparent cover sheet and said display panel.

* * * * *